(12) United States Patent
Gomes De Oliveira et al.

(10) Patent No.: US 10,597,316 B2
(45) Date of Patent: Mar. 24, 2020

(54) SYSTEM FOR IMPLEMENTATION OR DE-POLLUTION AND REVITALIZATION OF ARTIFICIAL OR NATURAL LAKES

(71) Applicant: DT ENGENHARIA DE EMPREENDIMENTOS LTDA, Alphaville, Barueri (BR)

(72) Inventors: João Carlos Gomes De Oliveira, Santana de Parnaíba (BR); Procópio Gomes De Oliveira Netto, Santana de Parnaíba (BR); Felipe Gomes De Oliveira, Santana de Parnaíba (BR); Daniel Gomes De Oliveira, Santana de Parnaíba (BR)

(73) Assignee: DT ENGENHARIA DE EMPREENDIMENTOS LTDA, Alphaville, Barueri (BR)

( * ) Notice: Subject to any disclaimer, the term of this patent is extended or adjusted under 35 U.S.C. 154(b) by 0 days.

(21) Appl. No.: 16/007,222

(22) Filed: Jun. 13, 2018

(65) Prior Publication Data
US 2019/0382294 A1    Dec. 19, 2019

(51) Int. Cl.
*C02F 1/76* (2006.01)
*C02F 1/52* (2006.01)
(Continued)

(52) U.S. Cl.
CPC .................. *C02F 1/76* (2013.01); *C02F 1/14* (2013.01); *C02F 1/24* (2013.01); *C02F 1/5281* (2013.01);
(Continued)

(58) Field of Classification Search
CPC .... C02F 1/76; C02F 1/14; C02F 11/16; C02F 11/121; C02F 1/24; C02F 1/5281;
(Continued)

(56) References Cited

U.S. PATENT DOCUMENTS 4,824,285 A * 4/1989 Trierweiler ............... E02B 3/04
                                                                405/15
5,224,794 A * 7/1993 Atkinson ................. E02B 3/06
                                                                405/32
(Continued)

FOREIGN PATENT DOCUMENTS

CN          1256250 A      6/2000
FR          2769013 A1 *   4/1999
(Continued)

*Primary Examiner* — Fred Prince
(74) *Attorney, Agent, or Firm* — Browdy and Neimark, P.L.L.C.

(57) ABSTRACT

A system for implementation or de-pollution and revitalization of artificial or natural lakes, inserted in land block and street structures around them, aiming at modulation in the artificial or natural lakes, insertion of dividing walls made of vinyl curtain, land dykes, concrete walls, or any other way, dividing the artificial or natural lake in isolated places, so there is no contact between the water of each module, considering that each module can be used for different activities, such as bathing, water sports, fishing, etc., considering that the water of the artificial or natural lake is de-polluted through the portable or the stationary treatment unit and preferably, conditioned into containers.

12 Claims, 10 Drawing Sheets

(51) Int. Cl.
*C02F 1/24* (2006.01)
*C02F 11/12* (2019.01)
*C02F 11/16* (2006.01)
*C02F 1/14* (2006.01)
*E02B 3/10* (2006.01)
*C05F 7/00* (2006.01)
*C02F 11/121* (2019.01)
*C02F 103/00* (2006.01)
*C02F 103/42* (2006.01)

(52) U.S. Cl.
CPC ............ *C02F 11/121* (2013.01); *C02F 11/16* (2013.01); *C05F 7/005* (2013.01); *E02B 3/10* (2013.01); *C02F 2103/007* (2013.01); *C02F 2103/42* (2013.01); *C02F 2301/043* (2013.01); *C02F 2301/046* (2013.01); *C02F 2303/02* (2013.01); *C02F 2303/04* (2013.01)

(58) Field of Classification Search
CPC ............ C02F 2303/02; C02F 2301/046; C02F 2301/043; C02F 2103/42; C02F 2103/007; C02F 2303/04; C05F 7/005; E02B 3/10

USPC ........ 210/167.11, 170.09, 170.1, 747.5, 756, 210/758, 198.1, 754
See application file for complete search history.

(56) References Cited

U.S. PATENT DOCUMENTS

| | | | |
|---|---|---|---|
| 6,802,978 B2 | 10/2004 | Gomes De Oliveira et al. | |
| 7,820,055 B2 | 10/2010 | Fischmann Torres | |
| 8,465,651 B2 | 6/2013 | Fischmann | |
| 8,753,520 B1 | 6/2014 | Fischmann | |
| 2003/0082006 A1* | 5/2003 | Dreyer | E02B 15/08 405/63 |
| 2012/0261347 A1* | 10/2012 | Hassler | C02F 1/281 210/683 |

FOREIGN PATENT DOCUMENTS

| | | | |
|---|---|---|---|
| JP | 59-222294 A | | 12/1984 |
| JP | 4-115007 A | * | 4/1992 |
| JP | 4-115008 | | 7/2008 |

* cited by examiner

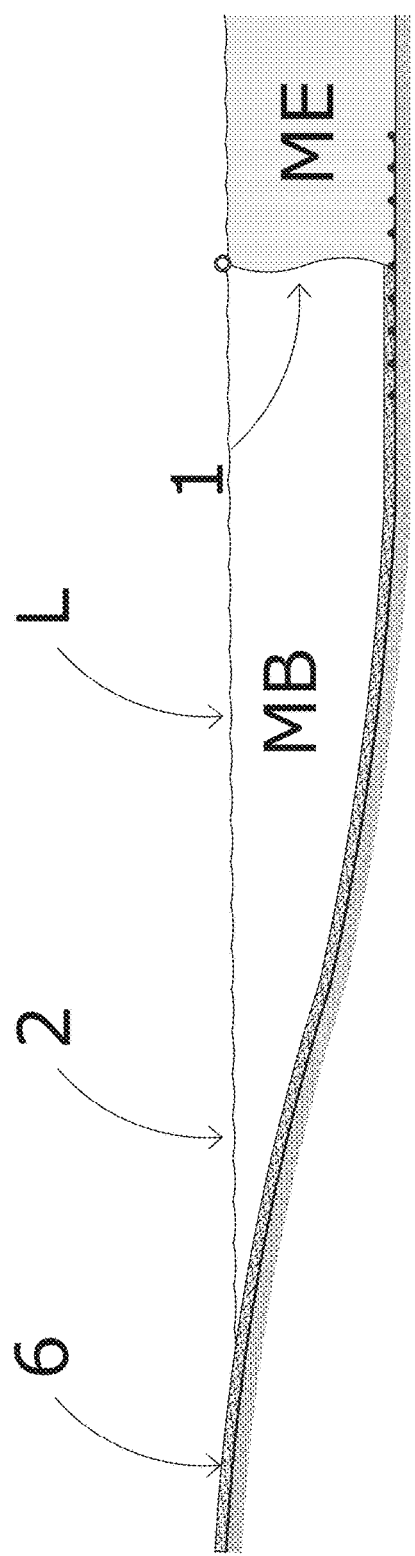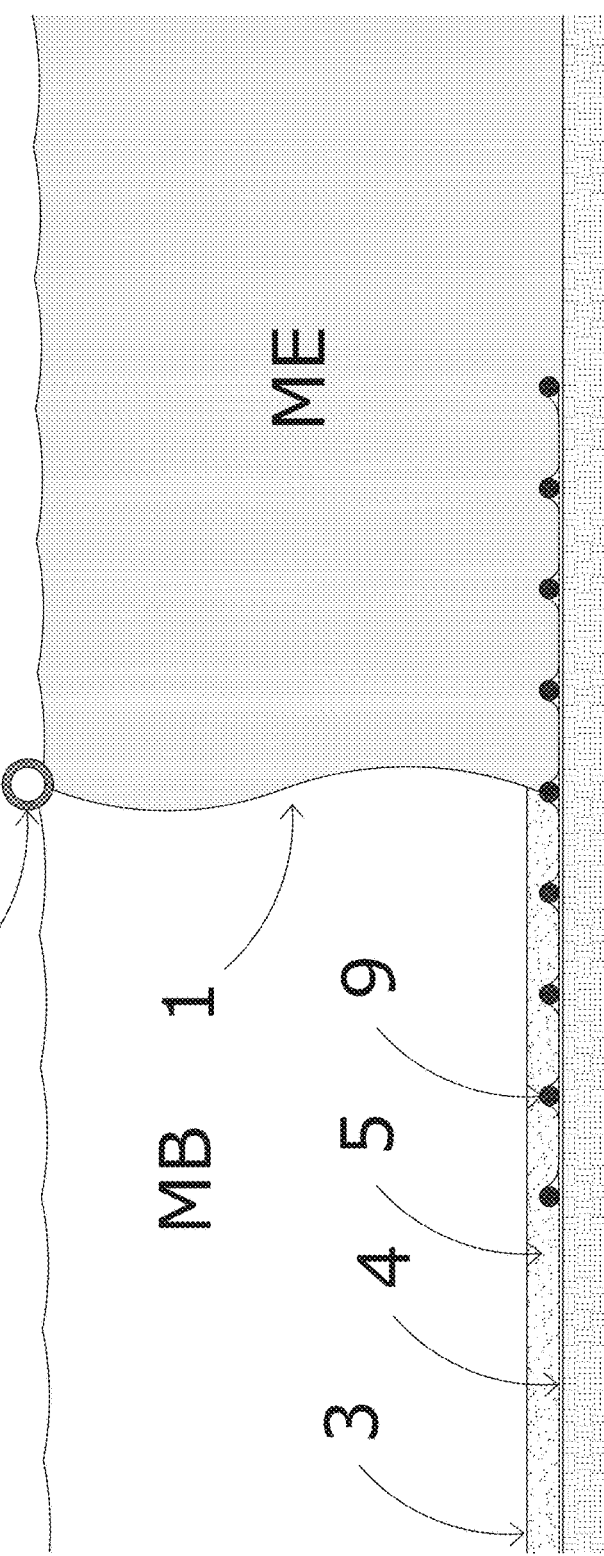

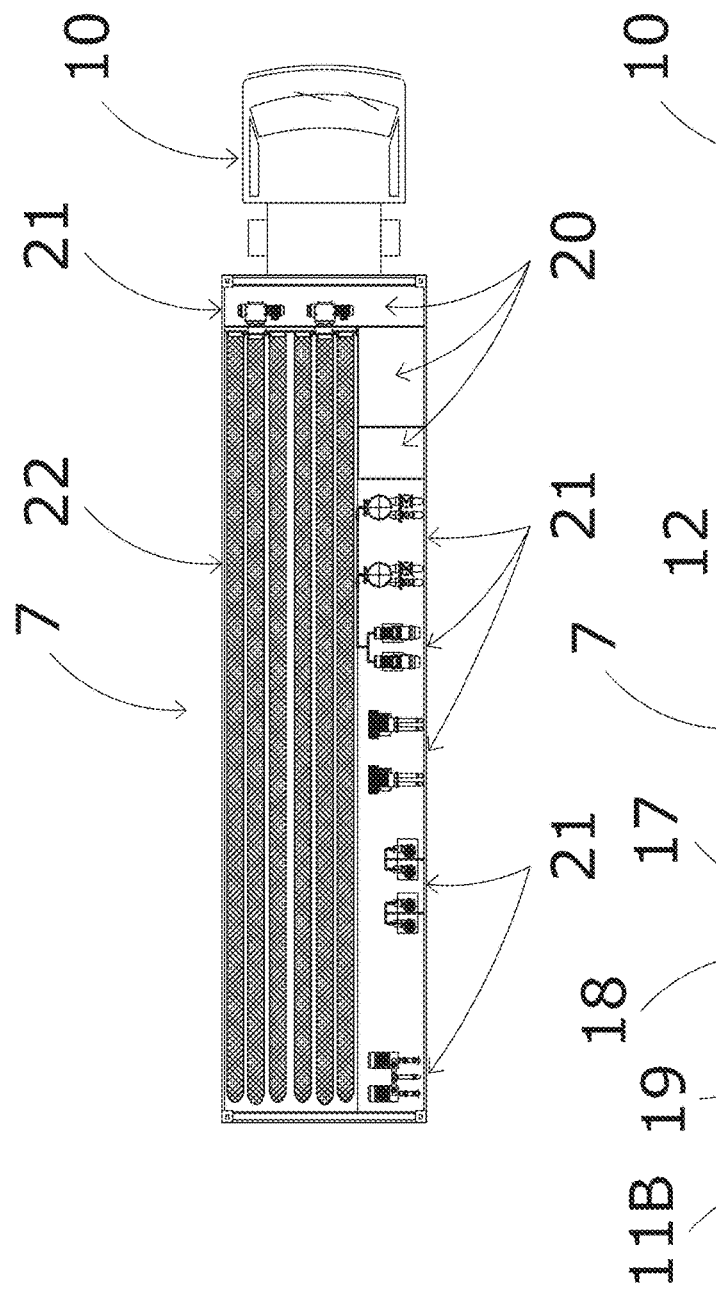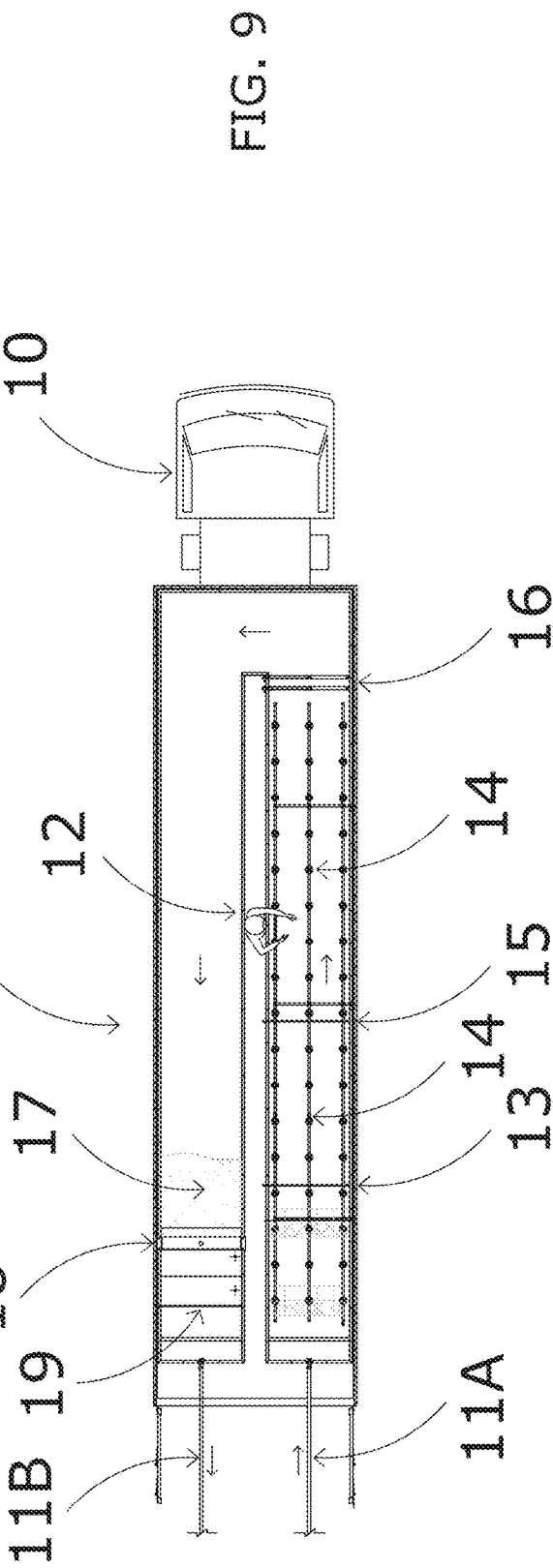

SYSTEM FOR IMPLEMENTATION OR DE-POLLUTION AND REVITALIZATION OF ARTIFICIAL OR NATURAL LAKES

TECHNICAL FIELD

The present system is about implementing or de-polluting and revitalizing artificial or natural lakes, in order to make them proper for use by the population for bathing, water sports, fishing, contemplation, etc.

BACKGROUND

The real estate occupation is a reality, where the existing natural areas are replaced by allotments, constructing streets, avenues, promenades and logically, houses, whether for living or summer vacation.

In different regions, because of the characteristics of wet lands, to construct buildings, it is necessary to extract high volumes of sand from the referred lots, in order to landfill them.

This sand extraction makes the streets and the buildings to be constructed on higher level, while inside the referred lots, artificial lakes are formed, which remain at lower level than that of the buildings and the streets.

These artificial lakes are incorporated to the lots occupied by the buildings, making them inseparable part of the urban structure.

The water in these artificial lakes comes from the proper water table and it is stuck, without constant or continuous affluent, receiving only intermittent pluvial volumes.

As there is no appropriate circulation or treatment, the waters in these artificial lakes degrade and become improper for use by people.

In addition to the natural degradation of the stagnated water, these artificial lakes receive all diffuse pollution coming from buildings, surrounding land and streets and avenues for being a lower point in the lot.

The banks of the artificial lakes are mostly composed of lawns, which are treated with NPK-based (nitrogen, phosphor and potassium) fertilizers.

The rain water "washes" these lawns and carries this NPK to the artificial lake, as well as all diffuse pollution in the surroundings, such as tree leaves and urban garbage.

The nutrients (NPK), as well as the organic matter coming from the diffuse pollution deposited in the artificial lakes sustain the proliferation of water weeds, which help degrading the water of the referred artificial lake.

The water weeds are responsible for the elimination of the oxygen from the water, once these weeds breathe at night, consuming the oxygen from the water, not allowing the creation of fish and causing increase of the bad smell of the lake in question, a phenomenon called eutrophication.

This also occurs in natural lakes, where the buildings are constructed around the referred lake, which, at the beginning is attraction for the implementation of the enterprise; however, over time, the pollution mentioned before occurs, making the lake a problem for the buildings because of the worsening of the quality of their water.

To minimize this problem, aerators are eventually installed in the referred artificial or natural lakes, in order to promote the water oxygenation.

However, such aerators, in addition to being driven by electric power, leading to high cost for the owners of the surrounding properties, the referred aerators do not eliminate the problem with the degradation of the lakes, once they cannot manage to de-pollute them for human use.

Different technologies are broadly used for disinfection and/or treatment of water mass; however, most of these technologies are high cost and impracticable for use in artificial or natural lakes situated in urban allotments.

None of these technologies provides implementation and/or revitalization or de-pollution of artificial or natural lakes at very low cost for implementation, modulated and portable, enabling full revitalization for use of the referred artificial or natural lake for bathing, water sports, fishing and contemplation, considering that such use can be concomitant.

Furthermore, the maintenance of the system shall be done in longer periods, so that operation cost is low.

Another factor to be highlighted is enabling elimination of the aerators, which are already existing in the artificial or natural lakes, by means of treatment, which eliminates the proliferation of water weeds and keeps the oxygenation of the water.

ANALYSIS OF THE STATE OF ART

Methods and processes for de-pollution of water courses or maintenance of the quality of big water bodies are already known, highlighting other patents and applications for invention patents of the same applicant in the United States, which has broad experience in this engineering area, highlighting document U.S. Pat. No. 6,802,978B2, which presents an environmental process, including micro application of flocculating/coagulating material in the water course, followed by micro flocculation to aggregate suspended particles downstream, defining flakes of bigger size; the aggregate particles are submitted to dissolution and air injection, causing micro floating of aggregate particles, enabling micro aggregation of the floating material downstream; then, the water flow is led to a secondary current/effluent, submitted to air injection or aeration; medium application of flocculating/coagulating material in this secondary water course to aggregate particles downstream, evidencing flakes of bigger dimensions; the aggregate particles are submitted downstream for dissolution and air injection, submitting the urban water course to air injection or intercalation of aeration, causing macro floating of aggregate particles and macro aggregation of the floating material downstream; removing this material along an urban section before the effluent reaches the water damn for urban supply.

Document CN1256250, which presents a process of water purification through micro-flocculation using inorganic flocculating agent and filtration of high molecular weight and direct depth.

Document JP59222294 provides a purification process for river and lake water through water pumping. This process provides cleaning of the lake by pumping water, passing through a packed pipeline equivalent to a filter.

Document JP4115008 aims cleaning of lakes with communication to the sea, enabling passage of the sea water to the lake and its return to the sea.

Document U.S. Pat. No. 7,820,055B2 protects a system for cleaning big water bodies, in which the cleaning is done at 7 (seven) days maximum, considering that perfect is to clean at every 4 (four) days and remove the whole water at every 150 (one hundred and fifty) days. This document provides replacement of the filtering by a suction device and skimmers plus application of controlled oxygen pulses, which are essential parts of the process.

Document U.S. Pat. No. 8,465,651B2 provides a system for treatment of water masses, enabling use for bathing at the limit of 0.05 baths per cubic meter of water, with cleaning at every 7 (seven) days. This process provides treatment of a small part of the water in the lake, and, when returning to the lake, this clean water mixes with the non-clean water of the lake and dilutes the contamination, making the water usable for a small number of bathers (0.05 baths per cubic meter of water maximum).

Document U.S. Pat. No. 8,753,520B1 provides treatment of a small portion of the water within a bigger water mass. This small portion is separated from the bigger portion of water and it is treated, including by using chemical products, considering that use is restricted to this small treated portion, while the portion left (the bigger) is not treated in any way whatsoever.

SUMMARY

Thus, thinking about providing improvement of the environment and the use of the existing artificial or natural lakes by the surrounding population, the applicant has developed a low-cost system for implementation or de-pollution and revitalization of artificial or natural lakes.

As it is publicly known, there are thousand of artificial or natural lakes spread throughout the world, and mainly, throughout the United States, pursuant to extraction of sand for landfill of real estate and road allotments.

These artificial lakes, or even the natural ones, suffer from degradation of their water, making them improper for human use or even for contemplation.

The present system provides implementation or de-pollution of artificial or natural lakes, contemplating treatment of the water, as well as their revitalization by means of sub-division of the artificial or natural lake in modules for bathing, practice of water sports, fishing, contemplation, etc., according to the need and/or the desire of the surrounding population.

The treatment of the water will be done by means of a modular and compact water treatment unit, outside the artificial or natural lake, which can be stationary at site, or preferably, portable and conditioned preferably in containers or any other way, once there is no need of daily treatment of the water mass, considering that this treatment can be done at intervals of time according to the need and the reading of the conditions of the water mass.

The portable treatment unit is taken to the artificial or natural, it performs the treatment, and at the end, it is taken to another artificial or natural lake for another task, and so on, drastically reducing the maintenance and the operation costs.

Because it is modular, as many portable treatment units as necessary can be used to provide de-pollution of each specific artificial or natural lake, depending on its size and volume of water to be treated.

In addition to treating the water of the artificial or natural lake itself, it is possible to capture, treat and lead water from another external source of water, such as another lake, river, damn, bay or sea, considering that the water can be fresh, brackish or salty, and it can also be from a source polluted with not collected sanitary sewage, very common in urban water bodies. Thus, in addition to de-pollution, the portable treatment unit can replace water in artificial or natural lakes with volume reduction problem due to drought or any other type of technical problem, which results in reduction of their volume.

The treatment process itself is carried out in a treatment channel with continuous water course, which includes micro application of flocculating or coagulating material in the water course; followed by micro flocculation for the aggregation of the suspended particles to occur, defining flakes of bigger dimensions; submitting these aggregate particles of bigger dimensions downstream the water course at least to one stage of dissolution and air or concentrated oxygen injection, causing micro floating of said aggregate particles; enabling micro agglomeration of the floated material downstream, which is removed from this water course; considering that as a last stage of the treatment, sodium hypochlorite or another oxidizing agent may be added to the treated water for its disinfection.

The division of the artificial or the natural lake in modules can be built preferably using vinyl curtains fixed at the lake banks, equipped with surface buoys and bottom ballasts, in order to impede exchange of water between the separations, the division can also be made of land dykes, concrete walls or any other way.

For revitalization of the artificial or natural lake, an artificial beach is created in the module destined for bathers; in addition to the adequate treatment of the water, it is necessary to inject sodium hypochlorite or another oxidizing agent to assure suitability to bathe; furthermore, the bottom of the artificial or natural lake is impermeabilized by means of vinyl blanket, concrete or any other means to impede contamination of the treated water with water from the water table.

For conformation of the artificial beach, on the bottom impermeabilization, a layer of fine sand is added, in addition to landscape and urbanistic configuration by means of common equipment for urban beach.

This system enables full elimination of the aerators of the artificial and the natural lakes, once the treated water returns to the lake saturated of oxygen, in addition to removal of the smell, the organic matter and the nutrients inherent to the process of treatment by micro coagulation, micro flocculation and micro floating.

Regarding the treatment of the water, the sludge resulting from the de-pollution of the artificial or the natural lake, which is saturated of nutrients and organic matter, is conditioned in the upper part of the portable treatment unit in geo-textile tubes, which eliminate the water from the sludge; thus, it can be transported dry to the sanitary landfill it can be recycled and used as fertilizer in other regions, for example, in re-foresting areas or plantations.

BRIEF DESCRIPTION OF THE FIGURES

To complete the present description in order to comprehend the characteristics of the system for implementation or de-pollution and revitalization of artificial or natural lakes better, and according to the a preferential practical performance of such system, a set of drawings is submitted together with the description, where, as example, although not limited to, the following is presented:

FIG. 6 is a cross section of an artificial or natural lake with the water separated by means of vinyl curtain, creating the different modules;

FIG. 7 is a cross section of the vinyl curtain for the water separation, showing the beach sand and the impermeabilization of the artificial or natural bottom of the lake;

FIG. 8 is an aerial view of one module of the portable treatment unit on the truck for transport;

FIG. 9 is an internal view of one module of the portable treatment unit on the truck for transport;

DETAILED DESCRIPTION

Figure 1:
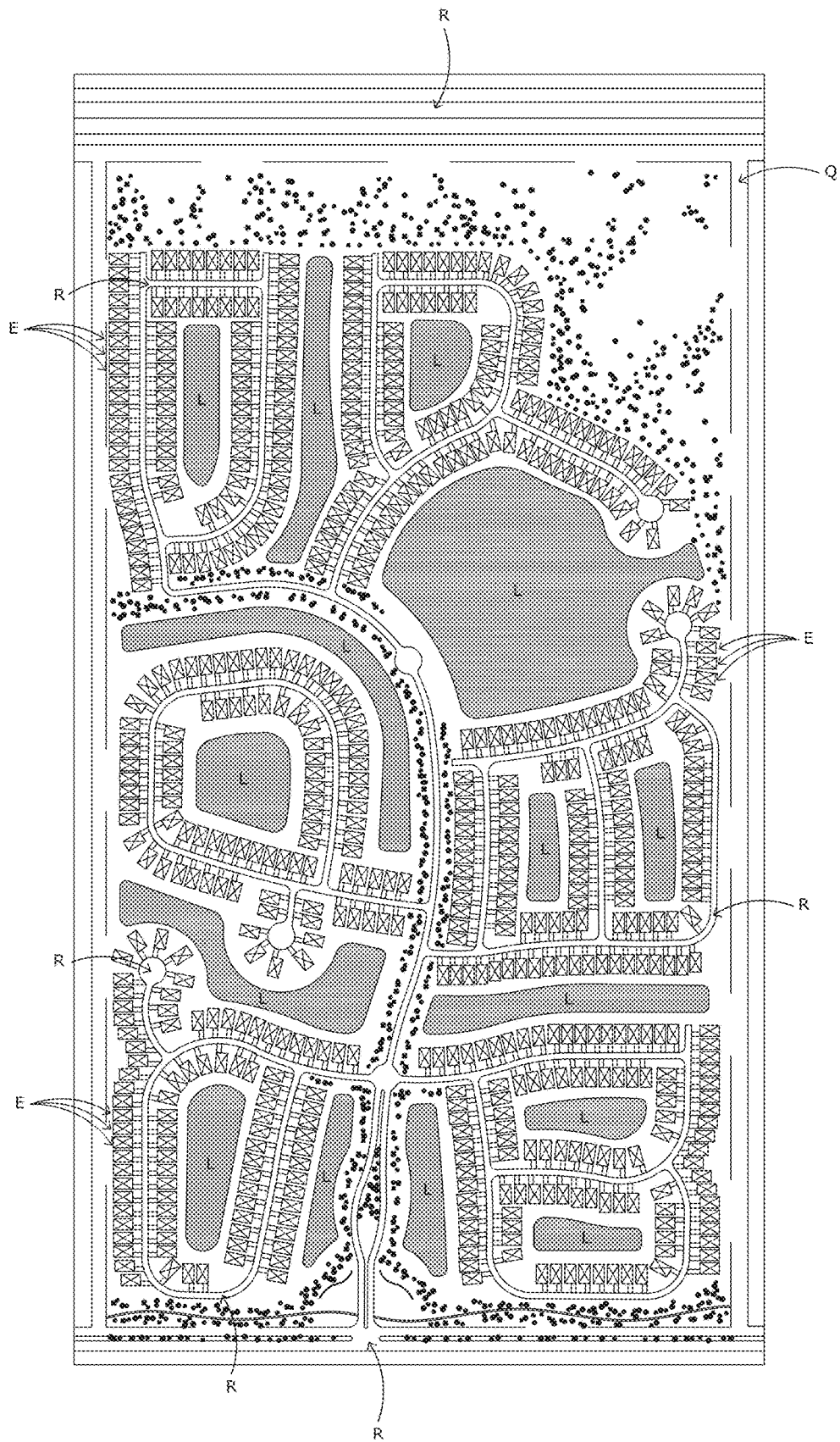
FIG. 1 is an aerial view of allotment with one block containing polluted artificial or natural lakes.
Figure 2:
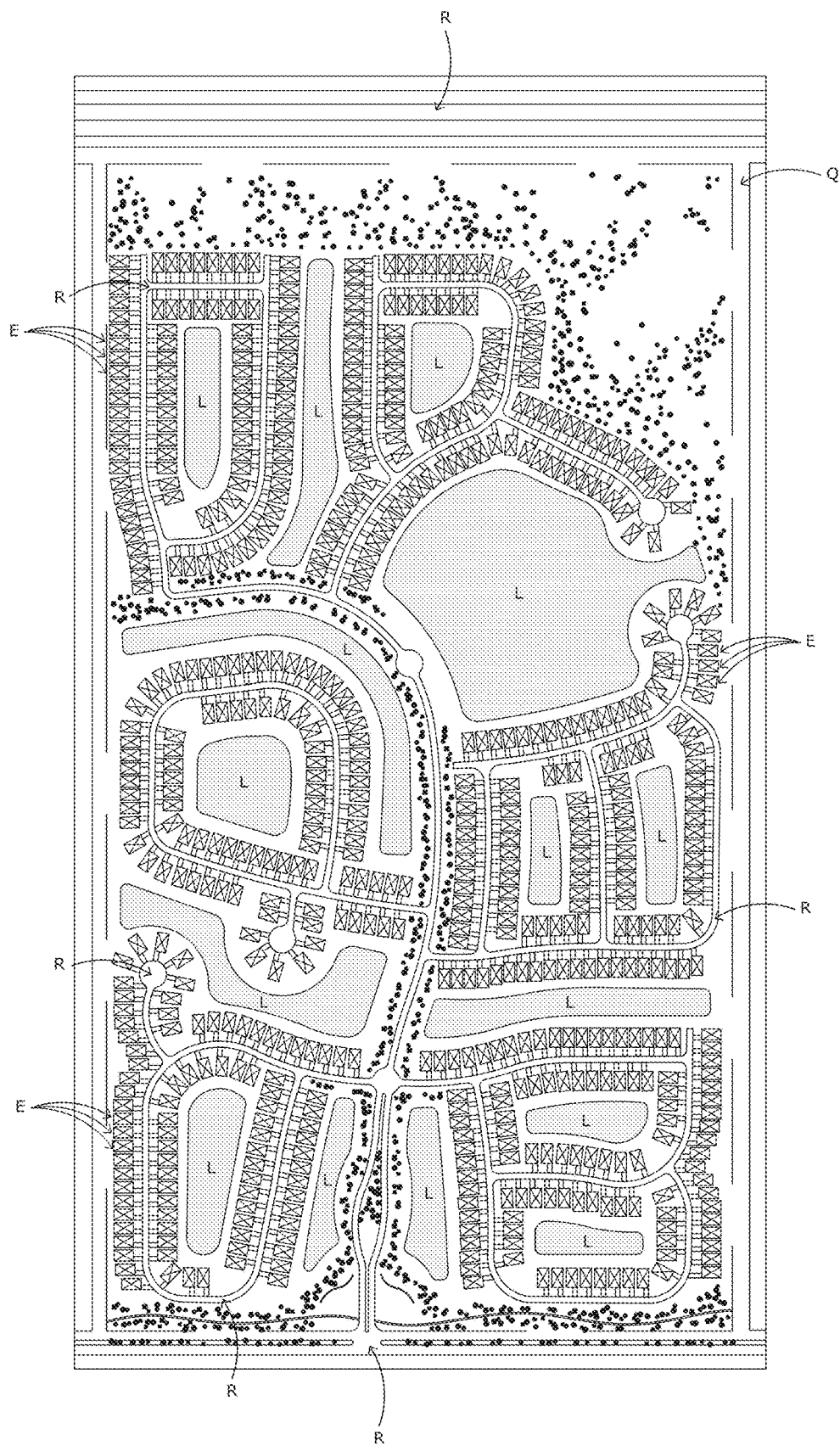
FIG. 2 is an aerial view of allotment with one block containing artificial or natural lakes, which have already been de-polluted by the portable treatment unit.
Figure 3:
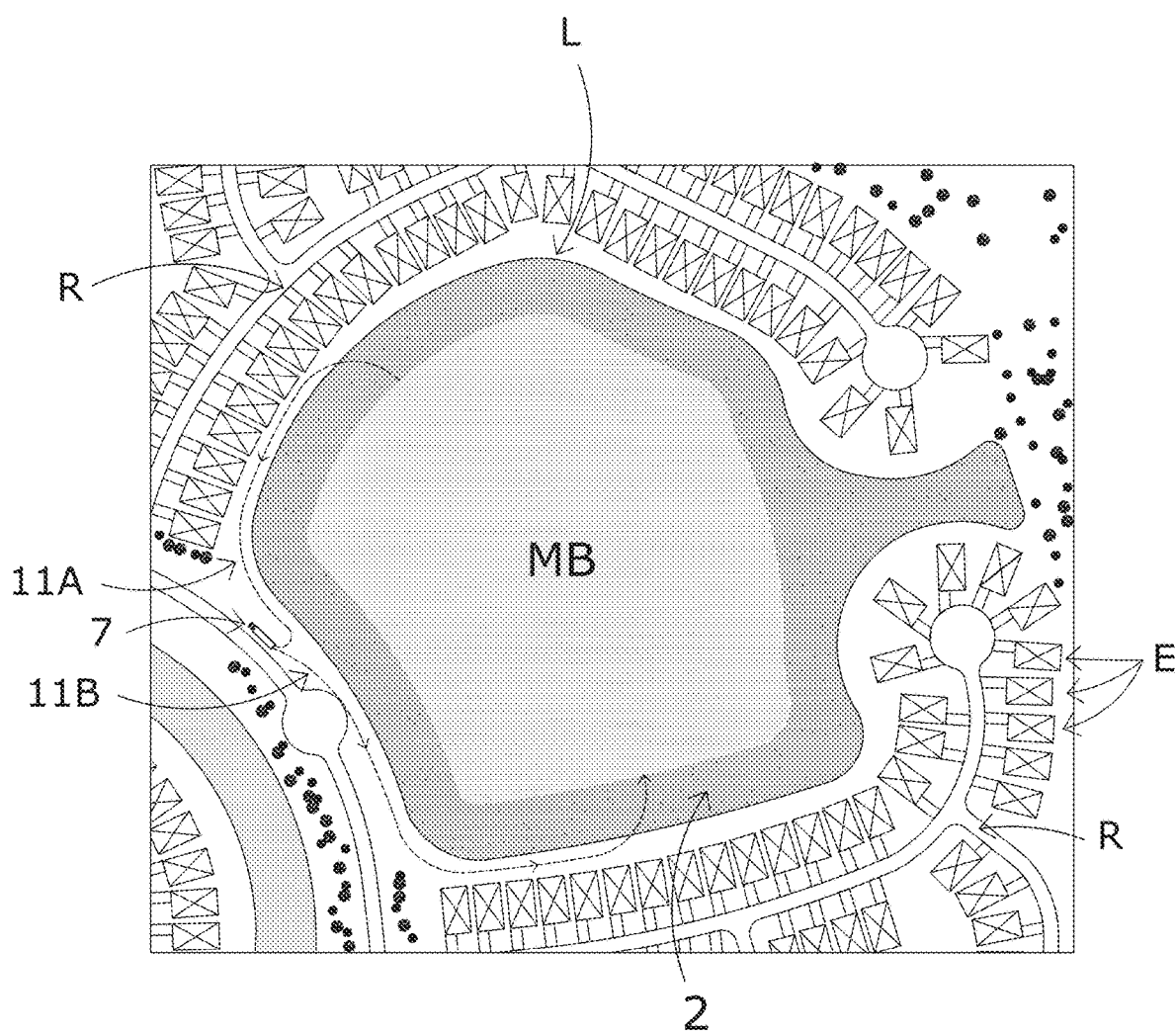
FIG. 3 is an aerial view of a artificial or natural lake, with use defined exclusively for bathing, creating artificial beach and with the water treatment system working.
Figure 4:
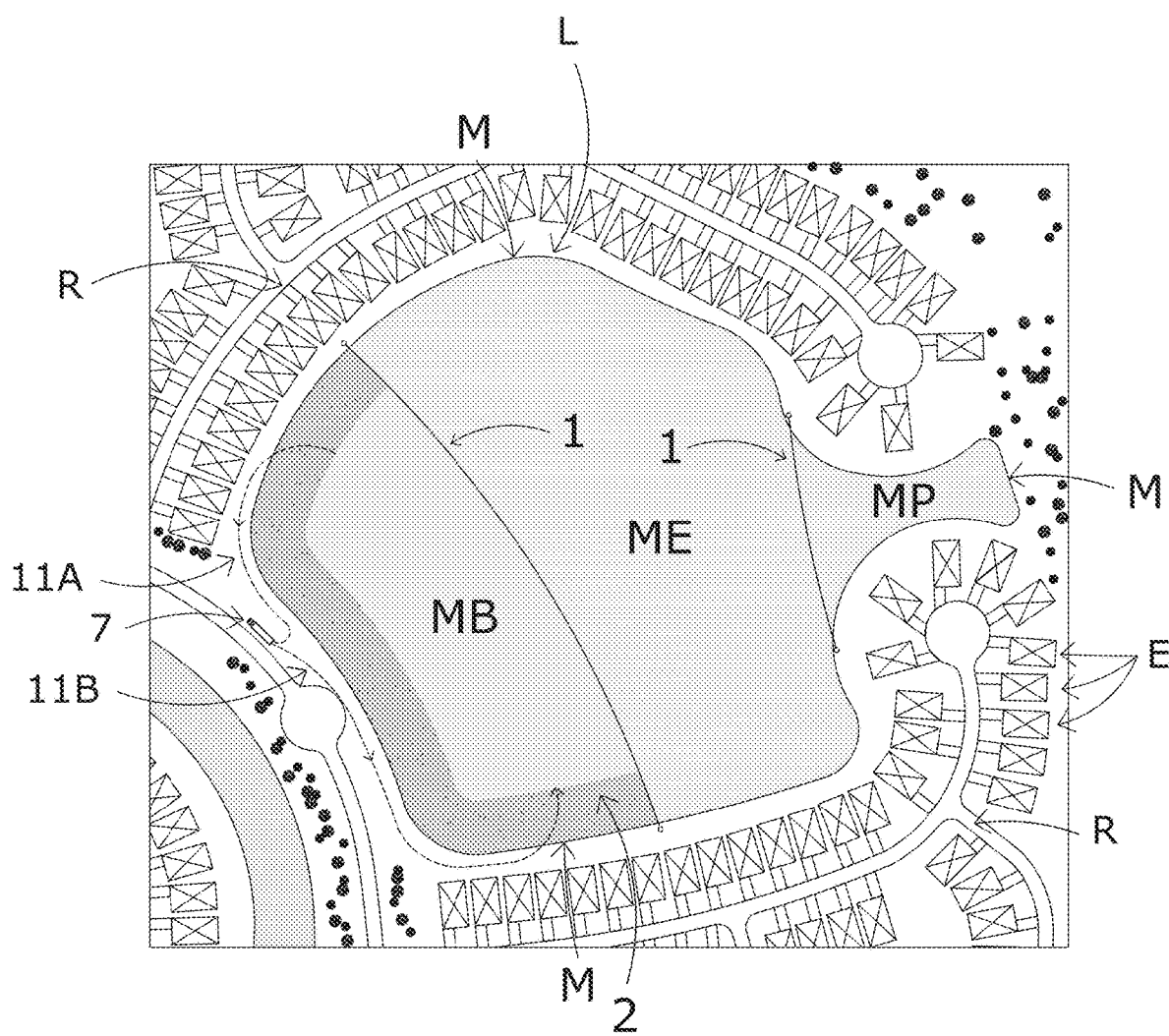
FIG. 4 is an aerial view of a artificial or natural lake, with its several modules defined for bathing, water sports and fishing, with the water treatment system working.
Figure 5:
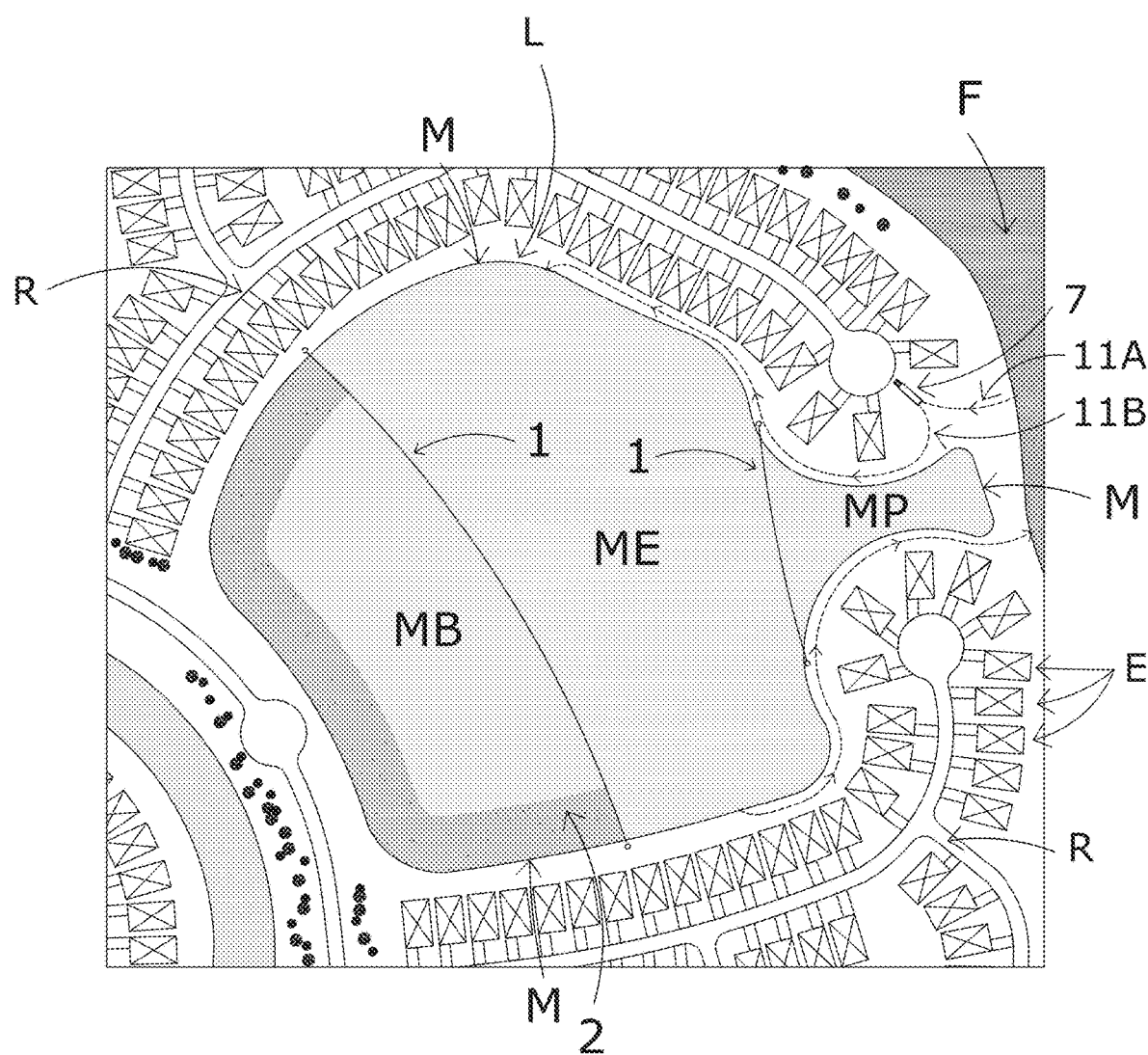
FIG. 5 is an aerial view of a artificial or natural lake, with its several modules defined for bathing, water sports and fishing, with the water treatment system working; however, capturing water from an external source, such as another lake, river, damn, bay or sea.
Figure 10:
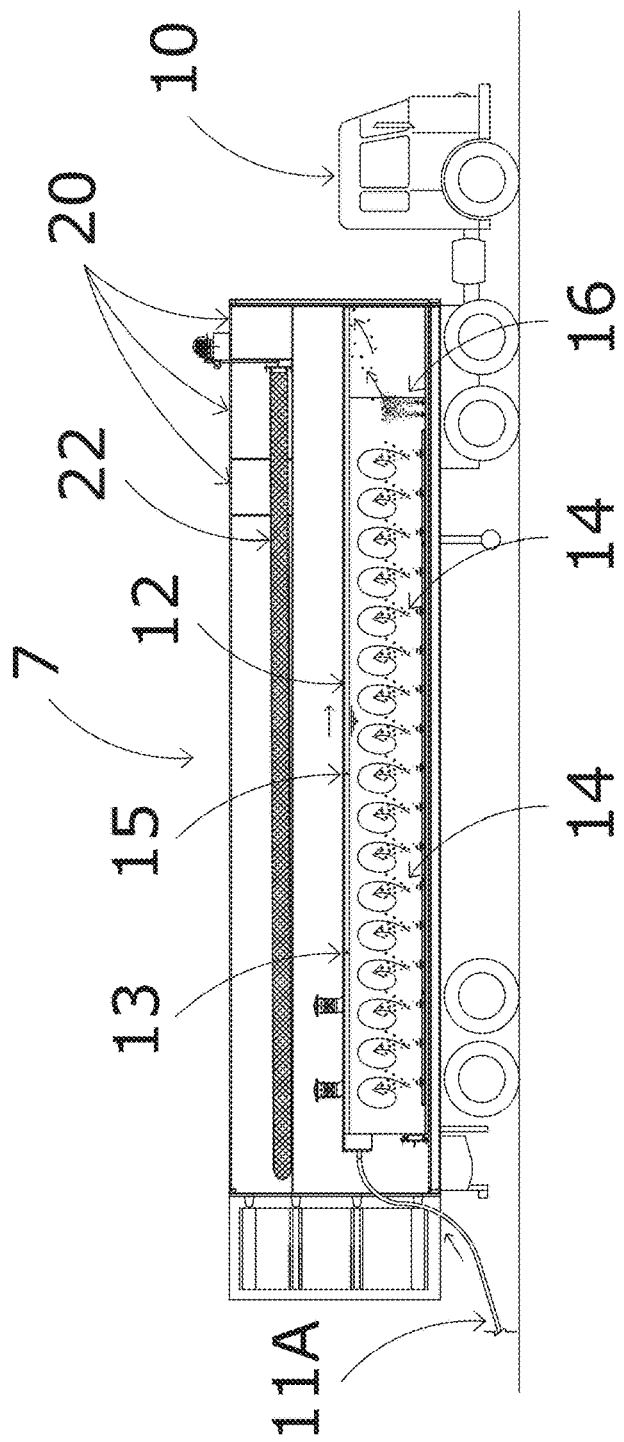
FIG. 10 is a longitudinal section of one module of the portable treatment unit on the truck for transport.
Figure 11:
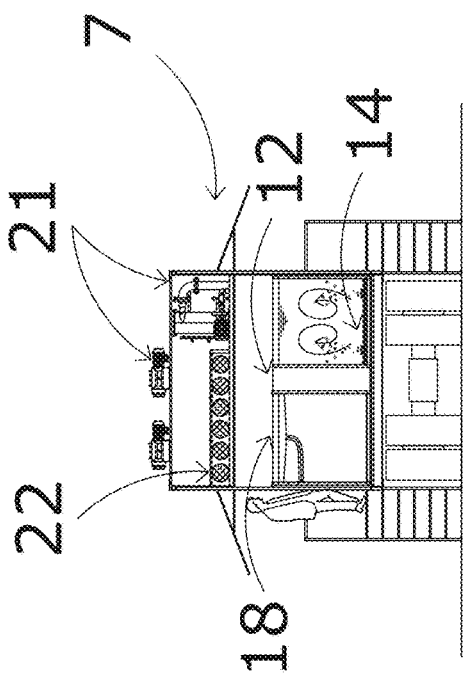
FIG. 11 is a cross section of one module of the portable treatment unit on the truck for transport.
Figure 12:
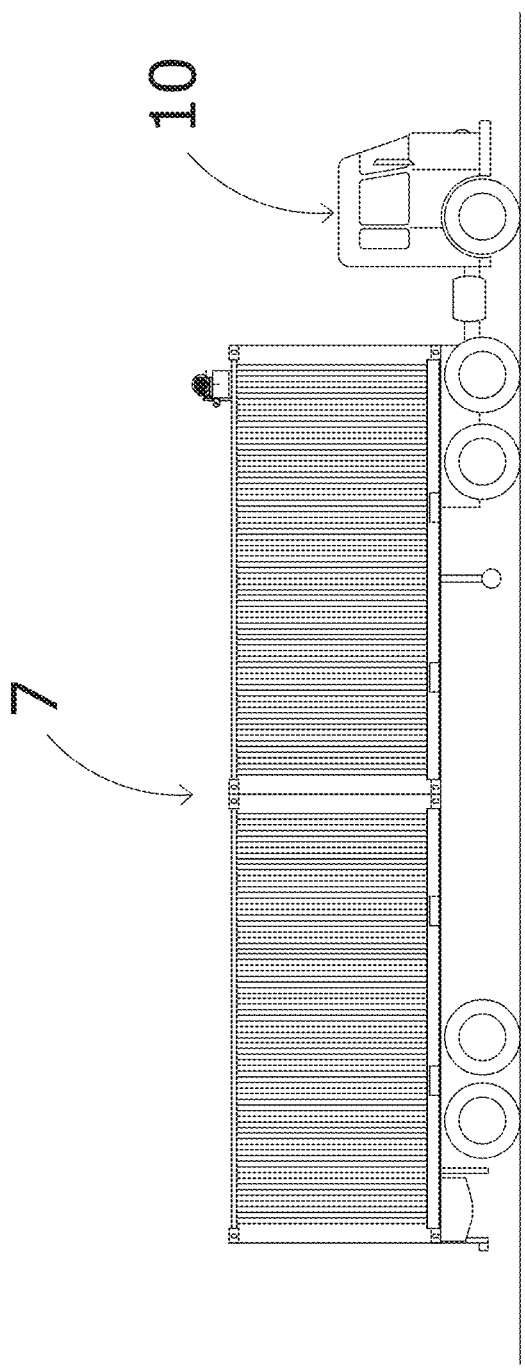
FIG. 12 is a side view of one module of the portable treatment unit conditioned in containers and on the truck for transport.
Figure 13:
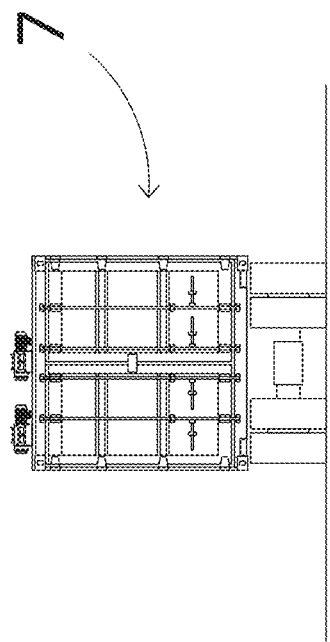
FIG. 13 is a back view of one module of the portable treatment unit conditioned in containers and on the truck for transport.
Figure 14:
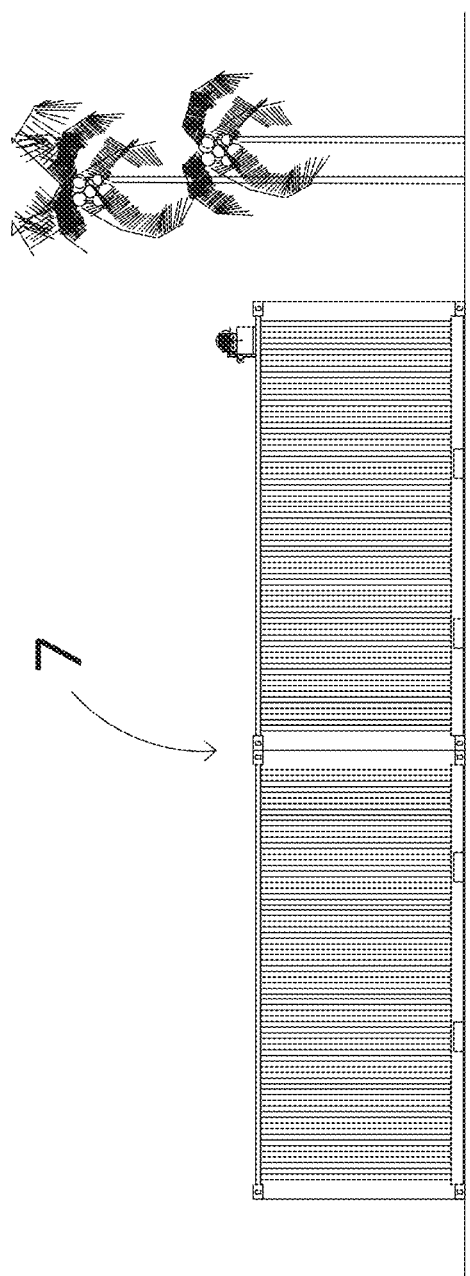
FIG. 14 is a side view of one module of the portable treatment unit conditioned in containers and unloaded on the ground in a place close to the artificial or natural lake to be treated.
Figure 15:
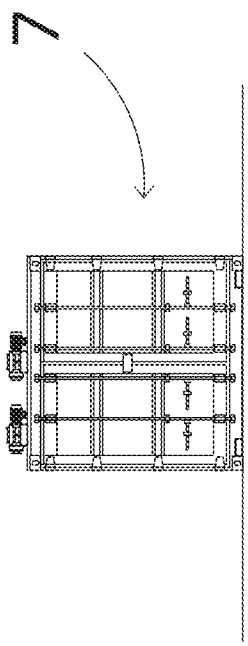
FIG. 15 is a back view of one module of the portable treatment unit conditioned in containers and unloaded on the ground in a place close to the artificial or natural lake to be treated.

With reference to the illustrated drawings, the present patent refers to a system for implementation or de-pollution and revitalization of artificial or natural lakes, more precisely, it is a system for implementation or de-pollution and revitalization of artificial or natural lakes (L), inserted inside the blocks (Q) of allotments, with buildings (E) and streets (R) in the surroundings, aiming at modulation (M) in the artificial or natural lakes (L), by inserting divisions (1) made of vinyl curtain, land dykes, concrete walls, or any other way, dividing the artificial or natural lake (L) in isolated spaces, in order to impede contact between the water in each module (M), considering that each module (M) can be used for different activities, such as bathing (MB), water sports (ME), fishing (MP), etc., considering that the water from the artificial or natural lake (L) is de-polluted by means of a portable or stationary treatment unit (7) and preferably conditioned in containers (7), according to FIGS. 14 and 15.

According to the present, it comprehends a system for implementation or de-pollution and revitalization of artificial or natural lakes (L), consisted of dividing walls (1), made preferably of vinyl curtains, which are provided with surface buoys (8) and bottom ballasts (9), or land dykes and concrete walls, to form modules (M) for different use, such as, bathing (MB), water sports (ME), fishing (MP), etc.

The modulation (M) of the artificial or natural lake (L) can be done in any scale, dimension or number, considering that it is limited only by the area of artificial or natural lake (L) itself.

The module (M) dimensioned for bathing (MB) gets compatible water treatment, considering that the maintenance of its suitability for bathing is assured by periodic treatment and dosage of sodium hypochlorite or another oxidizing agent.

For the formation of the artificial beach (2) in the bathing module (MB), the bottom (3) of the bathing module (MB) is impermeabilized (4) by means of vinyl, concrete coating, or made of any other material.

In the bathing module (MB), fine sand (5) at sufficient quantity is deposited from the margin (6) to the limit of the flooded area destined for bathing (1) (FIG. 6), forming the artificial beach (2) itself, considering that layer of fine sand (5) remains stationary, once in the artificial or natural lake (L), there is no considerable affluent flow rate.

The portable treatment unit (7) can remain stored close to the artificial or natural lake (L) or used on a transport truck (10), which reaches the artificial or natural lake (L), performs the treatment and at the end, it is transported to another artificial or natural lake (L), where the treatment cycle is restarted. The water is captured at a point of the artificial or natural lake (L) by pumping through flexible pipeline (11A), then, the water is de-polluted in the portable treatment unit (7), in continuous water course, and returns treated to the lake through another flexible pipeline (11B), preferably, the treated water shall return to the opposite side to that the polluted water has been captured from in the artificial or natural lake (L), creating water flow, thus, facilitating complete de-pollution of the artificial or natural lake (L).

In addition to treating the water from the artificial or natural lake (L) itself, it is possible to capture by flexible pipeline (11A), treat in the portable treatment unit (7) and bring it forward by flexible pipeline (11B) from another external source of water (F), such as another lake, river, damn, bay or sea, considering that the water can fresh, brackish or salty, and can also be from a source polluted by not collected sanitary sewage. Thus, in addition to de-pollution, the portable treatment unit (7) can replace water in artificial or natural lakes (L) with volume reduction problem due to drought or any other type of technical problem, which results in reduction of their volume.

The treatment process is carried out in a treatment channel (12) with continuous water course circumscribed inside the treatment station (7), which includes micro application of flocculating or coagulating material (13) in the water course (12); followed by micro flocculation (15), so that downstream, there is aggregation of suspended particles, defining flakes of bigger size; submitting such aggregate particles of big size to at least one dissolution and air or concentrated oxygen injection stage (16) downstream the water course (12), causing micro floating of said aggregate particles, enabling micro agglomeration of the floated material (17) downstream, which is removed from this water course (12) by a floating tray (18); considering that as last stage of the treatment, sodium hypochlorite or another oxidizing agent (19) can be added to the treated water, in order to assure its disinfection and use for bathing. This treatment process presents efficiency in removing pollutants over 95%, also eliminating smell and releasing the water saturated with oxygen, in addition to lack of need to perform any kind of water filtration process, which would make the operation cost too high.

In the treatment channel (12), there is not any physical division or space between the treatment stages, creating continuous water course (input in 11A and output at 11B), assuring maximum treatment capacity, increasing the hydraulic holding time and consequently, the higher treatment capacity, thus, reducing the implementation and operation costs. Furthermore, the treatment channel (12), circumscribed inside the treatment units (7), is the most efficient way for combining higher treatment capacity per installed area.

The micro coagulation (13) and the micro flocculation (15) stages are carried out in the continuous flow of the treatment channel (12), with precise control of the energy applied in the mixture by injection of fine, medium and coarse bubbles (14), with variable and controlled intensity, which increases the efficiency of the mixture of the coagulant and the flocculating agents in the water, as well as the formation of the clots and then the flakes, thus, reducing the consumption of these chemical products and consequently, their storage volume and the operation cost The tanks with chemical products (20) for coagulants, flocculating agents and sodium hypochlorite or another oxidizing agent, as well as the process equipment (21) necessary for the operation of the system, such as pumps, blowers, compressors and air/water mixers, are disposed preferably on the upper floor of the portable treatment unit (7), enabling the treatment channel (12) to be situated on the lower floor of the referred treatment unit (7) with possibility to be easily accessed by the system operator.

During the procedure for the cleaning of the water of the artificial or natural lake (L), in the sludge removed from the water by the portable treatment unit (7) through the floating tray (18), there is high content of solids, about 4%, which reduces the sludge storage volume, increasing the independence of the system and reducing the costs. Furthermore, said sludge is saturated by nutrients is conditioned in the upper part of the portable treatment unit (7) in geo-textile tubes (22), which eliminate the water from the sludge, and can receive sun light accelerating the process, and thus, the sludge can be transported dry to a sanitary landfill or recycled and used as fertilizer in other regions, for example, in re-bushing areas or plantations.

The invention claimed is:

1. A system for implementation or de-pollution and revitalization of artificial or natural lakes, wherein the system is provided with modulation in the artificial or natural lakes, by means of insertion of dividing walls made of vinyl curtain, land dykes, concrete walls, or any waterproof material, dividing the artificial or natural lake in isolated places, said system comprising said dividing walls, which form modules, said dividing walls being fixed to bottom of the artificial or natural lake without leaving any gaps or openings, and said dividing walls are above water level of said lake, so there is no contact between water of each module, wherein each module can be used for different activities of at least, one of bathing, water sports, fishing, wherein water of the artificial or natural lake is de-polluted through a mobile treatment unit conditioned into containers.

2. System for implementation or de-pollution and revitalization of artificial or natural lakes, according to claim 1, wherein the dividing walls, made of vinyl curtains, are provided with surface buoys and bottom ballasts, or land dykes and concrete walls, to form the modules for different use to at least one of bathing, water sports, fishing.

3. System for implementation or de-pollution and revitalization of artificial or natural lakes, according to claim 1, wherein one of the modules is dimensioned for bathing and gets compatible water treatment, wherein a maintenance of a bathing condition is assured by periodic treatment and dosage of sodium hypochlorite or another oxidizing agent.

4. System for implementation or de-pollution and revitalization of artificial or natural lakes, according to claim 1, wherein one of the modules is a bathing module, and, for a formation of an artificial beach in the bathing module, a bottom of the bathing module is impermeabilized by means of vinyl, concrete coating, or made of any other waterproof material.

5. System for implementation or de-pollution and revitalization of artificial or natural lakes, according to claim 1, wherein one of the modules is a bathing module, and, in the bathing module, sand at sufficient quantity is deposited from margin to a limit of a flooded area destined for bathing, forming an artificial beach, comprising a sand layer that remains stationary, once in the artificial or natural lake, because said lake has an rate of effluent flow sufficiently minimal such that the effluent flow cannot carry said sand.

6. System for implementation or de-pollution and revitalization of artificial or natural lakes, according to claim 1, wherein the mobile treatment unit can remain stored close to the artificial or natural lake or used on a transport truck, which reaches the artificial or natural lake, performs treatment and after completion of said treatment, said mobile treatment can be transported to another artificial or natural lake, where a treatment cycle is restarted, with water being captured at a point of the artificial or natural lake by pumping through flexible pipeline, then, water is de-polluted in a mobile treatment unit, in continuous water course, and returns treated to the lake through another flexible pipeline, whereby treated water shall return to the opposite side from where polluted water has been captured from the artificial or natural lake, creating water flow, thus, facilitating complete de-pollution of the artificial or natural lake.

7. System for implementation or de-pollution and revitalization of artificial or natural lakes, according to claim 1, wherein, in addition to treating water from the artificial or natural lake itself, it is possible to capture by flexible pipeline, treat in the mobile treatment unit and bring it forward by flexible pipeline from another external source of water, comprising at least one of another lake, river, dam, bay or sea, the water from the external source being fresh, brackish or salty, or from a source polluted by not collected sanitary sewage, in addition to de-pollution of the external water source, such that the mobile treatment unit can replace water in artificial or natural lakes, where there is a problem with volume reduction due to drought or any other kind of technical problem, which results in volume reduction.

8. System for implementation or de-pollution and revitalization of artificial or natural lakes, according to claim 1, wherein a treatment process is carried out in a treatment channel with continuous water course circumscribed inside the mobile treatment unit, which includes micro application of flocculating or coagulating material in the water course; followed by micro flocculation, so that downstream, there is aggregation of suspended particles, defining flakes of bigger size; submitting such aggregate particles to at least one dissolution and air or concentrated oxygen injection stage downstream the water course, causing micro floating of said aggregate particles, enabling micro agglomeration of floated material downstream, which is removed from the water course by a floating tray; wherein as last stage of treatment, sodium hypochlorite or another oxidizing agent can be added to treated water, in order to assure its disinfection and use for bathing; wherein the treatment process presents efficiency in removing pollutants over 95%, also eliminating smell and releasing water saturated with oxygen, in addition to lack of need to perform any kind of water filtration process.

9. System for implementation or de-pollution and revitalization of artificial or natural lakes, according to claim 1, wherein in a treatment channel, there is not any physical division or space between treatment stages, creating continuous water course, assuring maximum treatment capacity, increasing a hydraulic holding time and consequently, higher treatment capacity, thus, reducing costs of implementation and costs of operation, considering that the treatment channel, circumscribed inside the mobile treatment unit, is a most efficient way for combining higher treatment capacity per installed area.

10. System for implementation or de-pollution and revitalization of artificial or natural lakes, according to claim 1, wherein micro coagulation and micro flocculation stages are carried out in continuous flow of a treatment channel, with precise control of energy applied in a mixture by injection of fine, medium and coarse bubbles, with variable and controlled intensity, which improves a mixing of coagulant and flocculating agents in water, as well as a formation of clots and then flakes, thus, reducing a consumption of chemical products and consequently, their storage volume and cost of operation.

11. System for implementation or de-pollution and revitalization of artificial or natural lakes, according to claim 1, wherein tanks with chemical products for coagulants, flocculating agents and sodium hypochlorite or another oxidizing agent, and others process equipment necessary for operation of system are packed on a roof of the mobile treatment unit, enabling a treatment channel to be situated on a lower floor with possibility to be easily accessed by a system operator.

12. System for implementation or de-pollution and revitalization of artificial or natural lakes, according to claim 1, wherein, during a procedure for cleaning of water of the artificial or natural lake, in sludge removed from the water by the mobile treatment unit through a floating tray, there is high content of solids, about 4%, which reduces sludge storage volume, increasing independence of the system and reducing costs, the sludge being saturated by nutrients, the sludge being packed on a roof of the mobile treatment unit in geo-textile tubes, which eliminate water from sludge, and the sludge can receive sun light accelerating a process of eliminating the water, and thus, the sludge can be transported dry to a sanitary landfill or recycled and used as fertilizer in other regions.

* * * * *